United States Patent Office 2,710,812
Patented June 14, 1955

2,710,812

CARBONACEOUS CEMENT

Clarence E. Greider, Lakewood, and Myron R. Null, Berea, Ohio, assignors to Union Carbide and Carbon Corporation, a corporation of New York No Drawing. Application January 19, 1954,
Serial No. 404,900

3 Claims. (Cl. 106—217)

This invention relates to a carbonaceous cement particularly suited for use in joining carbon electrodes.

Recent developments in arc lamps for motion picture projection, searchlights, and the like have increased the consumption rate of the positive electrode to such an extent that the time of continuous operation is substantially reduced. At the same time there is a growing demand for longer periods of continuous operation of such devices. Due to the construction of lamps and electrode feeding devices it is impractical to lengthen the positive electrodes sufficiently to provide the desired increased life. Accordingly, there is a demand for some means of connecting a new electrode to a partially consumed electrode to provide continuous operation.

It is the principal object of this invention to satisfy this demand, and another important object of the invention is a carbonaceous cement, particularly suited for use in joining illuminating carbon electrodes.

The invention comprises a carbonaceous cement consisting of finely-divided carbon, an aqueous sugar solution as a binder, and ethylene glycol. More specifically the cement contains about 45 to 55 parts by weight of carbon, 40 to 55 parts of binder and 5 to 20 parts by weight of ethylene glycol. A preferred binder is a solution containing about 75 parts by weight of glucose and 25 parts by weight of water. A typical cement embodying the invention contains, by weight about 46 parts carbon flour, 43 parts binder and 11 parts ethylene glycol.

In using the cement of the invention for joining electrode sections, a recess may be provided on one end of the electrode section and a tongue in the opposite end thereof. The cement is applied either to the recess of one section or the tongue of another section, or to both, and is allowed to dry. As a section is consumed during use in an arc lamp, another section may be added to it by inserting its tongue into the recess of the section already in use. As the joint approaches the jaws holding the electrode, the heat from the arc conducted through the carbon causes the binder of the cement to "coke" (i. e. to become carbonized) and in coking to bond the two sections together.

To be useful for joining electrode sections as described a cement must retain sufficient plasticity after it is applied to permit a good fit and must provide a strong bond so that the sections do not separate as the electrode is consumed in the arc. The glycol included in the cement of the invention is essential to the attainment of both of these characteristics.

While the invention has been described with particular reference to its use in joining illuminating carbon electrodes, it is useful for joining other carbon articles, for instance electrothermic electrodes.

What is claimed is:

1. A carbonaceous cement consisting of about 45 to 55 parts by weight of finely-divided carbon; 45 to 55 parts by weight of an aqueous sugar solution as a binder; and 5 to 20 parts by weight of ethylene glycol.

2. A carbonaceous cement consisting of about 45 to 55 parts by weight of finely-divided carbon; 45 to 55 parts by weight of an aqueous solution of glucose as a binder; and 5 to 20 parts by weight of ethylene glycol.

3. A carbonaceous cement consisting of about 48 parts by weight of finely-divided carbon; 52 parts by weight of an aqueous solution of glucose as a binder; and 5 to 20 parts by weight of ethylene glycol.

References Cited in the file of this patent

UNITED STATES PATENTS

| | | |
|---|---|---|
| 1,662,958 | Cranz | Mar. 20, 1928 |
| 1,866,743 | Abbott | July 12, 1932 |